United States Patent [19]

Chapman

[11] Patent Number: 5,678,775
[45] Date of Patent: Oct. 21, 1997

[54] APPARATUS AND SYSTEMS THAT SEPARATE AND ISOLATE PRECIOUS AND SEMI-PRECIOUS METALS FROM ELECTRONIC CIRCUIT BOARDS

[75] Inventor: Ray Chapman, Argyle, Tex.

[73] Assignee: Resource Concepts, Inc., Dallas, Tex.

[21] Appl. No.: 582,788

[22] Filed: Jan. 4, 1996

[51] Int. Cl.⁶ .................................. B02C 23/14
[52] U.S. Cl. .............. 241/79.1; 241/152.2; 241/DIG. 38
[58] Field of Search ................ 241/79.1, 152.2, 241/DIG. 38, 80

[56] References Cited

U.S. PATENT DOCUMENTS

| | | |
|---|---|---|
| 2,942,792 | 6/1960 | Anderson et al. . |
| 3,848,813 | 11/1974 | Stanczyk et al. ............... 241/19 |
| 3,885,744 | 5/1975 | Drage ............................ 241/23 |
| 3,905,556 | 9/1975 | Drage . |
| 4,026,477 | 5/1977 | Tremolada . |
| 4,042,177 | 8/1977 | Cestaro et al. . |
| 4,044,956 | 8/1977 | Benedetto et al. . |
| 4,098,464 | 7/1978 | Niedner et al. ............... 241/24 |
| 4,384,683 | 5/1983 | Huwald et al. . |
| 4,397,424 | 8/1983 | Zappa et al. . |
| 4,414,076 | 11/1983 | Tabatabaie-Alavi . |
| 4,494,995 | 1/1985 | Tabatabaie-Alavi . |
| 4,637,928 | 1/1987 | Zajac, Jr. et al. . |
| 4,815,668 | 3/1989 | Frei ............................ 241/23 |
| 5,139,203 | 8/1992 | Alavi . |
| 5,217,171 | 6/1993 | Feldman . |
| 5,356,082 | 10/1994 | Prinz et al. ............... 241/24 |
| 5,377,920 | 1/1995 | Alavi et al. . |

FOREIGN PATENT DOCUMENTS

3347230 A1  11/1985  Germany .

OTHER PUBLICATIONS

R.S. Kaplan and H. Ness. "Review Article No. 13 –Recycling of Metals" –*Conservation & Recycling*, vol. 10, No. 1, pp. 1–13, 1987. Printed in Great Britain.

Primary Examiner—John M. Husar
Attorney, Agent, or Firm—R. Darryl Burke; Worsham, Forsythe & Wooldridge, L.L.P.

[57] ABSTRACT

An apparatus separates a substantially metallic portion from a substantially non-metallic portion of constituent components of at least one electrical product, comprising a plurality of crushing machines, such as a first crushing machine, a second crushing machine, and a third crushing machine and a separating machine. The first crushing machine crushes the at least one electrical product to create at least one crushed electrical product. The first crushing machine has a first screen affixed thereto to regulate a first flow of the at least one first crushed electrical product from the first crushing machine. The second crushing machine crushes the at least one first crushed electrical product to create at least one second crushed electrical product. The second crushing machine has a second screen affixed thereto to regulate a second flow of the at least one second crushed electrical product from the second crushing machine. The third crushing machine crushes the at least one third crushed electrical product to create at least one third crushed electrical product. The third crushing machine has a third screen affixed thereto to regulate a third flow of the at least one third crushed electrical product from the third crushing machine. The at least one separating machine receives the at least one third crushed electrical product from the third crushing machine to separate the metallic portions from the non-metallic portions of the at least one electrical product. A plurality of air separators may be used to remove non-metallic light weight materials from the crushed electronic products to deposit in a collection bin and to return the portions of the light weight material that comprise metallic material to the stream of crushed material. A plurality of conveyors may also be used to transport the at least one first, second, and thrid crushed electrical products to and from the first crushing machine, the second crushing machine, the third crushing machine, and the at least one separating machine.

59 Claims, 5 Drawing Sheets

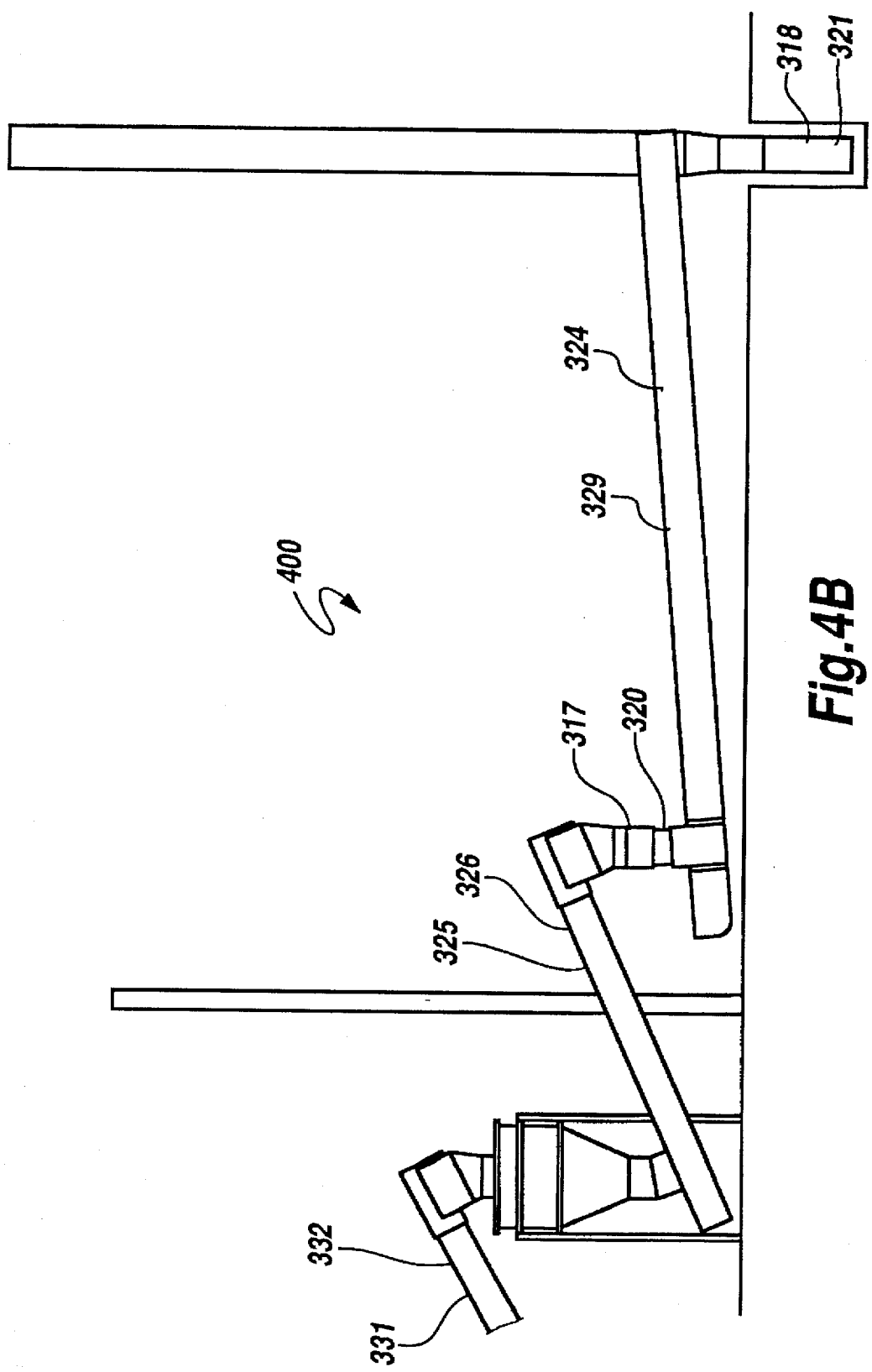

APPARATUS AND SYSTEMS THAT SEPARATE AND ISOLATE PRECIOUS AND SEMI-PRECIOUS METALS FROM ELECTRONIC CIRCUIT BOARDS

PARTIAL WAIVER OF COPYRIGHT PURSUANT TO 1077 O.G. 22(Mar. 20, 1987)

©Copyright, Ray Chapman 1995. All of the material in this patent application is subject to copyright protection under the copyright laws of the United States and of other countries. As of the first effective filing date of the present application, this material is protected as unpublished material.

However, permission to copy this material is hereby granted to the extent that the owner of the copyright rights has no objection to the facsimile reproduction by anyone of the patent document or patent disclosure, as it appears in the United States Patent and Trademark Office patent file or records, but otherwise reserves all copyright rights whatsoever.

FIELD OF INVENTION

In general, the present invention relates to an apparatus and process for separating the constituent components of Printed Wiring Assemblies (hereinafter "PWA's") and Printed Wiring Boards (hereinafter "PWB's") (i.e., the unpopulated boards and trim scrap from which the unpopulated boards are produced). In particular, the invention relates to a dry, mechanical process and an associated apparatus whereby PWA's or PWB's are successively and repeatedly crushed into a granular mixture of materials, which may be separated into granular forms of non-metallic and metallic constituent components suitable for reclamation, recycling, and reuse.

CROSS-REFERENCE TO RELATED APPLICATIONS

This application hereby incorporates by reference the following patent applications and, when issued, patents:

| Docket No. | U.S. Pat./Ser. No. | Filing Date/Issue Date | Title |
| --- | --- | --- | --- |
| 3685-002001 | 08/582,784 | 01/04/96 now pending | Process for the Separation and Isolation of Precious and Semi-Precious Metals from Electronic Circuit Board |
| 3685-002002 | 08/582,780 | 01/04/96 now pending | Apparatus and Process for the Separation of the Metallic and Non-Metallic Constituent Components of Printed Wiring Assemblies and Printed Wiring Boards having and using a Feedback Path |
| 3685-002003 | 08/582,778 | 01/04/96 now pending | Apparatus and Process for the Separation of the Metallic and Non-Metallic Constituent Components of Printed Wiring Assemblies and Printed Wiring Boards having and using a Feedback Path |

BACKGROUND

Over the past three decades, since the inception of the integrated circuit and the computer, consumer acceptance combined with technological advances has produced an exceptionally strong market for electrical/electronic products that use integrated circuits and computers for the distribution and manipulation of information and dam. The integrated circuits are often encapsulated in ceramic packages, mounted on PWB's to form PWA's, and, ultimately, packaged in various electrical or electronic equipment and appliances (i.e., plastic compartments). PWA's have become ubiquitous in such items as personal and business computers, telecommunications equipment, television sets, and other consumer electronic systems. Normal wear-and-tear and the extraordinary rate of technological change in the capabilities PWA's and PWB's have combined to produce a dramatic increase in the amount of obsolete electronic equipment produced in recent years. Despite the fact that much of this unusable or unwanted equipment contains a multitude of hazardous ingredients including copper and lead, much of this equipment is disposed of by simply plating it in private or municipal landfill sites. This approach is problematic for a variety of reasons. For instance, this approach has the potential for leaking toxic materials into the environment (i.e., water table). In addition, this approach unnecessarily dedicates limited landfill capacity. Consequently, consumer, business, and governmental entities are increasingly directed at the ecologically sound disposal of such equipment and have an intensifying interest in recycling the raw materials such equipment contains.

The disposal of PWA's and PWB's, however, involves special problems. Some of the special problems of properly disposing and/or recycling electrical/electronic equipment and appliances relate to the manner in which PWA's and PWB's are manufactured. PWB's are made by laminating two or more layers of fiberglass reinforced epoxy or polyimide resins with copper foil. The laminate is then coated with a metallic material, usually copper, upon which circuits are traced by a variety of imaging and etching techniques. In addition to quality defects that produce unusable PWB's, the process for producing finished, etched PWB's creates up to 20% waste as trim scrap. Because the material from which PWB's are made is a thermoset, the base can not be remelted and reused once it is produced. Similarly, PWA's are produced from PWB's by soldering or otherwise affixing functional components, such as chips of integrated circuit (hereafter "IC's"), connectors and other components to the base. The composition of these components includes such precious metals as Gold, Silver, Palladium and Platinum which are encapsulated in ceramic or epoxy resins.

Some existing techniques dispose of PWA's and PWB's in the following fashion. PWA's may be stripped of any reusable components. The partially depopulated PWA's are then sent to a smelter where they are pyrolized to burn off volatile constituents and then crushed. The resulting ash is then reduced by melting and the precious and semi-precious metals are recovered through several pyrometallurgical stages. The value of the precious metals is then calculated, after subtracting the cost of the smelting process, and this value is returned to the supplier of the PWA's.

This process has several disadvantages when complete PWA's arc sent directly to smelters:

the smelting process is inherently costly in term of energy usage;

the pryolsis process produces air pollutants that must be scrubbed from oven stacks or otherwise converted into carbon dioxide, which is an environmentally unfriendly substance;

the resulting "sludge" from the smelting process is returned to the landfill, which uses up limited landfill capacity and, in some circumstances, may leak into the environment; and sampling techniques to determine the precious metal content of the PWA's prior to the smelting operation are impractical and unreliable.

Alternatives to the direct starting of PWA's include techniques that seek to separate various metal constituent components from the non-metallic constituent components of complete electrical/electronic systems. These techniques include mechanical crushing of electrical/electronic units followed by magnetic separation to remove ferrous metals, followed either by sink flotation techniques to remove lighter weight non-metallic or metallic constituent components; or by density separation techniques followed by treatment of the resulting metallic or non-metallic portions with strong adds, bases or toxic cyanide; or by elaborate series of grinding and density separation steps to completely separate such metals as copper from aluminum and nickel. These approaches still require hazardous components such as Cathode Ray Tubes (CRTs), mercury switches, and Polychlorobiphenly containing capacitors, frequent components of electronic assemblies, to be removed manually. In addition, they involve chemical or water treatment that requires careful and costly monitoring of effluents for hazardous ingredients and/or are costly with respect to the value of the reclaimed materials.

SUMMARY

Generally, in preferred embodiments, PWA's, are removed from electrical or electronic systems, either manually or by a gross shredding operation that is performed on the assembled unit after hazardous items, such as CRTs, mercury switches and Polychlorobiphenyl containing capacitors, are removed. Alternatively, PWB's are simply provided to preferred embodiments. Then, PWB's and/or PWA's are successively and continuously crushed to reduce the overall size of the constituent components. The resulting constituent components contain a mixture of metallic and non-metallic base materials and are separated from one another using the specific gravity of the fractions of material produced. This mechanical process of repeated size reduction and separation generally renders PWA's or PWB's into three fractions: (A) a granular form of the metallic constituent that allows reproducible and reliable chemical analysis of its elemental composition and permits efficient reclamation of the precious elements through subsequent refining processes; (B) a finely ground form of non-metallic PWB base material, generally comprising fiberglass and epoxy or polyimide resin, a "fines" fraction; and (C) an extremely finely ground form of non-metallic dust generally comprising the fiberglass and binding resins from the PWB base. These fractions are produced in various proportions depending on the composition of the PWA or PWB feed stock fractions (B) and (C) may be combined, together or separately, with other materials to produce composites that may be used in construction or industrial applications. These applications include, but are not limited to, sinks, desktops, highway lane dividers, highway sound barriers, electronic component cases, chemically resistant floor grating, tile, shingles, molding compounds, highway speed regulators, kitchen and bathroom countertops, and wallboard. Therefore, all components of PWA's or PWB's can be returned to constructive use rather than being placed in landfill sites. Because this process is completely dry and requires no incineration or chemical treatment steps, associated problems of monitoring effluent water, air or chemical waste streams are avoided.

Specifically, preferred embodiments of the apparatus that arc used to separate metallic and non-metallic constituent components from various types of PWA's/PWB's comprise a plurality of crushing machines, a plurality of conveyors, a plurality of screens, and at least one separating machine. The plurality of crushing machines (i.e., ring mills or hammer mills) generally have a first crushing machine and a second crushing machine, both of which have a corresponding entry port and exit port. In fact, each crushing machine of the plurality of crushing machines has a entry port and an exit port. Preferred embodiments use three (3) crushing machines. Likewise, the plurality of conveyors generally have a first conveyor and at least one second conveyor, both of which have a corresponding entry port and exit port. Once again, each conveyor also has a corresponding entry port and exit port. The conveyors are used to transport material after it has been crushed to and from the plurality of crushing machines. Three (3) closed conveyors are preferably used to transfer the material to and from the crushing machines. The series of three (3) crushing machines are used to successively reduce the size of the ground mixture prior to being supplied to the separating machine, thereby eliminating the need for further separating of the mixed products. Each crushing machine preferably has at least one screen affixed thereto which is positioned to regulate the flow of material generated or created by the crushing machine from the exit port. The screens allow passage of specifically sized products. The screens are collectively used to effectuate further size reduction of material in each crushing machine. The diameter of the openings in the screen of each crushing machine is progressively smaller than those in the preceding mill. For instance, the openings in the first screen preferably allow passage of specifically sized products having diameters in the range of $1/16"-2"$, whereas openings in the second screen preferably allow passage of specifically sized products having diameters in the range of $1/16"-1"$, and openings in the third screen allow passage of specifically sized products having diameters in the range of $1/16"-1/2"$. Of course, alternate diameters in the third screen are also preferred. The separating machine (i.e., gravity separator and fluidized bed separator) receives the crushed components from the plurality of crushing machines via the plurality of conveyors and separates the non-metallic constituent components from the metallic constituent components of PWA's/PWB's. The metallic constituent components are generally heavier than the non-metallic constituent components. A plurality of air separators may also be used to remove dust associated with the crushed PWA's/PWB's being transported by the plurality of conveyors. Each air separator has an air separator entry port and an air separator exit port and are mechanically linked with a collection apparatus (i.e., bag house filter) to collect the dust. Note the dust may be comprised of metallic and non-metallic portions. The heavier portions, which are largely comprised of metallic substances, are preferably not transported to a collection apparatus. Light weight portions of the airborne exit stream from each shredder and/or crushing machine are passed through an air separator, such as a cyclone air separator, which is a density classifier, to classify and separate heavier portions from lighter portions in order to allow heavier weight components to return to the processing stream thereby enriching the stream of material in metallic composition. The size-reduced stream is transported via a closed conveyor to the separator where metallic and non-metallic fractions from the process stream are separated based on specific gravity differences of the fractions. In addition, preferred embodiments may also comprise a shredder to shred PWA's/PWB's for initial size reduction before the PWA's/PWB's are crushed by the plurality of crushing machines for initial size reduction. A belt conveyor is preferably used to transfer the material to the plurality of crushing machines from the shredder.

Preferred processes to separate metallic and non-metallic constituent components of at least one electronic product are generally comprised of the following steps: (a) repeatedly crushing the at least one electronic product to create a plurality of crushed electronic components; (b) repeatedly screening the plurality of crushed electronic components to ensure that the plurality of crushed electronic components substantially conform to a specific size; and (c) separating the plurality of crushed electronic components after steps (a) and (b) into non-metallic constituent components and metallic constituent components by weight. In addition, before step (a), the at least one electronic product must be provided or otherwise transported to crushing machines to perform step (a). Likewise, the crushed electronic components must be transported from one crushing machine to another crushing machine and to the separating apparatus to perform step (c). As discussed above, preferred embodiments generally use at least three (3) crushing machines, so that the electronic product(s) is (are) generally crushed at least three (3) times (and transported between the crushing machines). The crushed electronic products are also periodically screened, such as after each crushing step to limit the size of the crushed materials in the stream of crushed materials being evaluated. Lightweight material is also removed from the stream of crushed materials by at least one air separator. Portions of lightweight material substantially comprised of non-metallic materials (i.e., dust) is transported to a collection apparatus. Portions of the light weight material that comprise metallic material are preferably returned to the stream of crushed material. The products can be shredded before step (a).

Specifically, preferred embodiments provide a number of advantages. Preferred embodiments substantially (and in some cases completely) recycle the constituents/components of PWA's and PWB's by separating the metallic from the non-metallic constituent components of which they are made and return all of these raw materials to reuse rather than sending them to a landfill, thereby reducing the dedication of limited landfill space to the disposal of electrical/electronic equipment. Preferred embodiments do not require incineration or chemical or water treatment procedures, which avoids potential problems with air or water pollution, to separate metallic and non-metallic constituent components of PWA's/PWB's. In addition, preferred embodiments perform the separation and recovery of metallic and non-metallic constituent components in a cost efficient way and in a manner that reclaims the maximum amount of precious and semiprecious metals from these materials.

Other advantages of the invention and/or inventions described herein will be explained in greater detail below.

BRIEF DESCRIPTION OF THE DRAWINGS

The accompanying drawings are incorporated into and form a part of the specification to illustrate several examples of the present inventions. These drawings together with the description serve to explain the principles of the inventions. The drawings are only for the purpose of illustrating preferred and alternative examples of how the inventions can be made and used and are not to be construed as limiting the inventions to only the illustrated and described examples. Further features and advantages will become apparent from the following and more particular description of the various embodiments of the invention, as illustrated in the accompanying drawings, wherein:

FIGS. 4A and 4B are elevation and line drawings of a portion 400 of the preferred embodiment shown in FIG. 3 used to implement the preferred process shown in FIG. 2.

DETAILED DESCRIPTION OF THE PREFERRED EMBODIMENT

Figure 1:
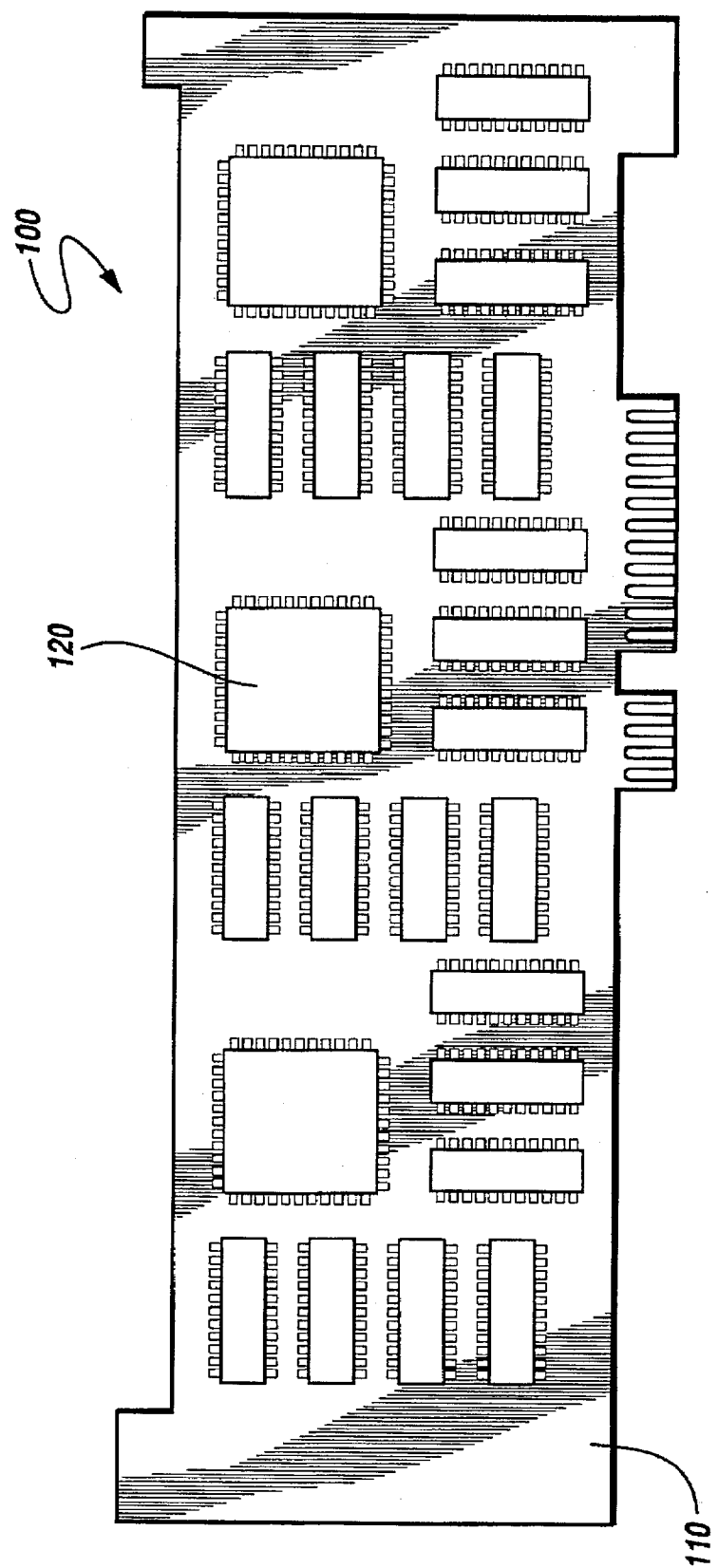
FIG. 1 is a top view of an illustration of a sample of a printed wiring assembly ("PWA") 100 having a printed wiring board ("PWB") 110 with electrical components 120 (i.e., encapsulated integrated circuits) placed thereon.

The present inventions will be described by referring to the preferred apparatus and method and by showing various examples of how the inventions disclosed herein can be made and used. When possible, like reference characters are used throughout the several views of the drawing to indicate like or corresponding parts. Specifically, the reference characters used in FIGS. 3, 4A, and 4B are intended to correspond to one another.

Figure 2:
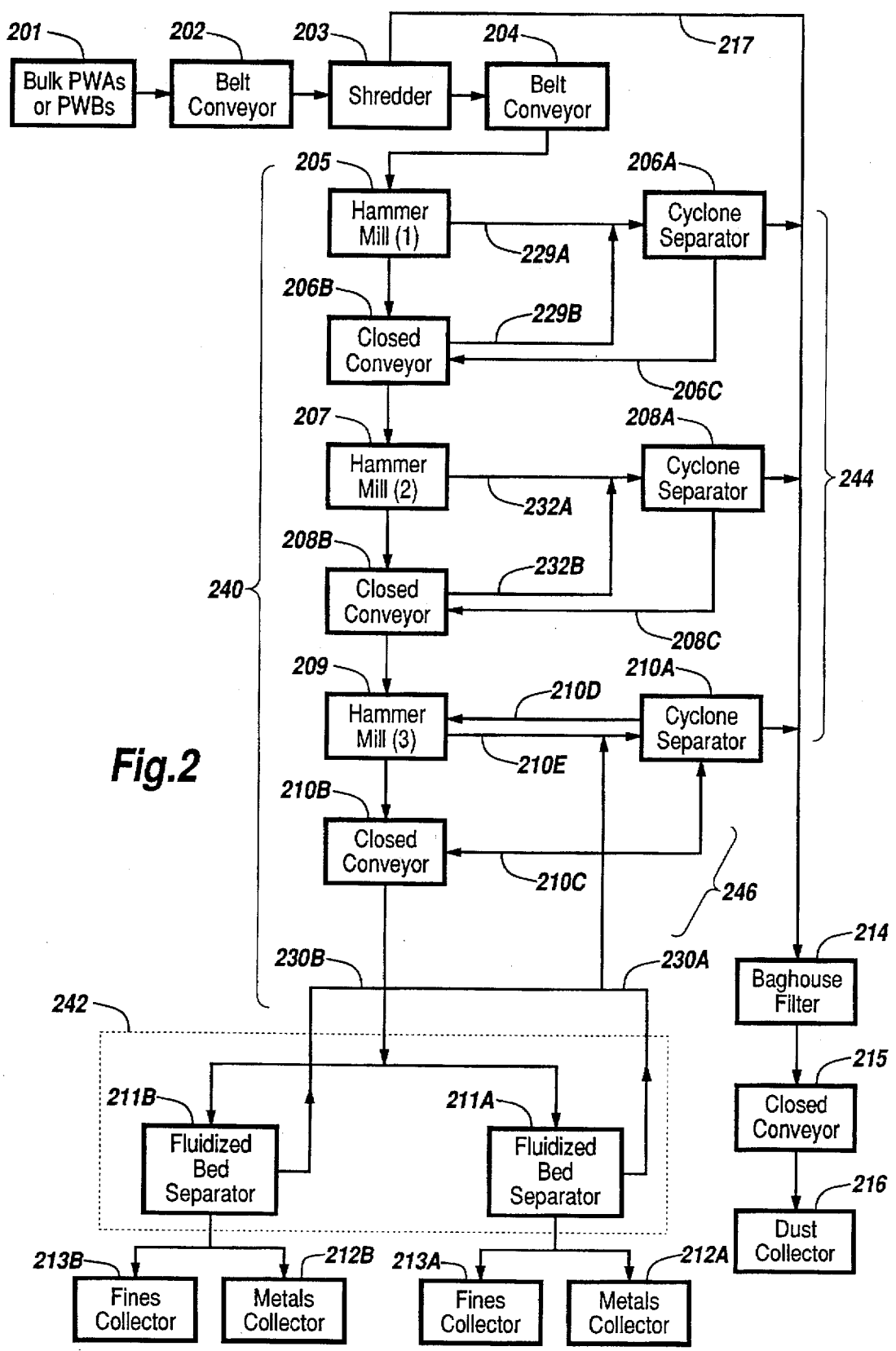
FIG. 2 is diagram illustrating the process flow 200 of a preferred processes to separate metallic and non-metallic components of PWA 100 and PWB 110.
Figure 3:
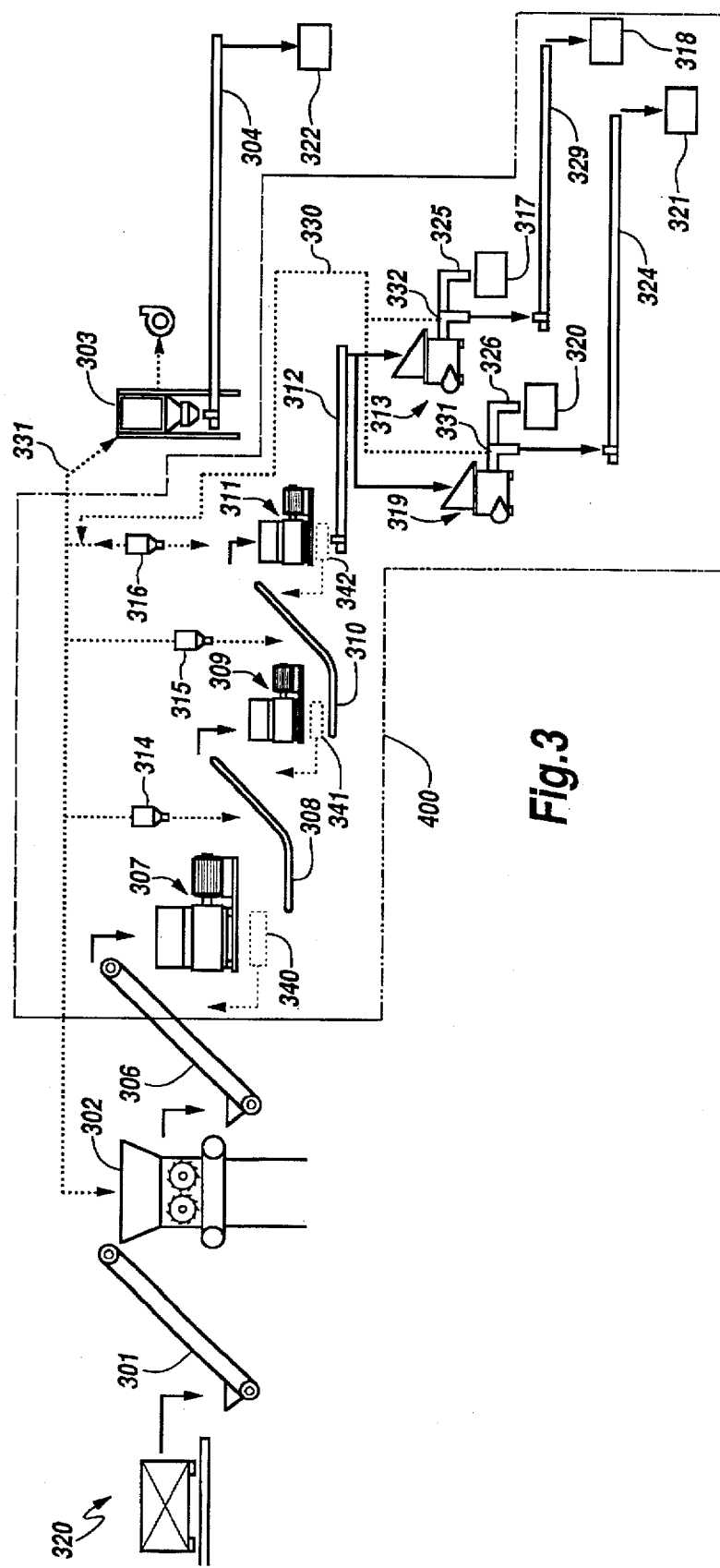
FIG. 3 is a diagram of a preferred embodiment showing the manufacturing line 300 used to implement the preferred process shown in FIG. 2.
Figure 4A:
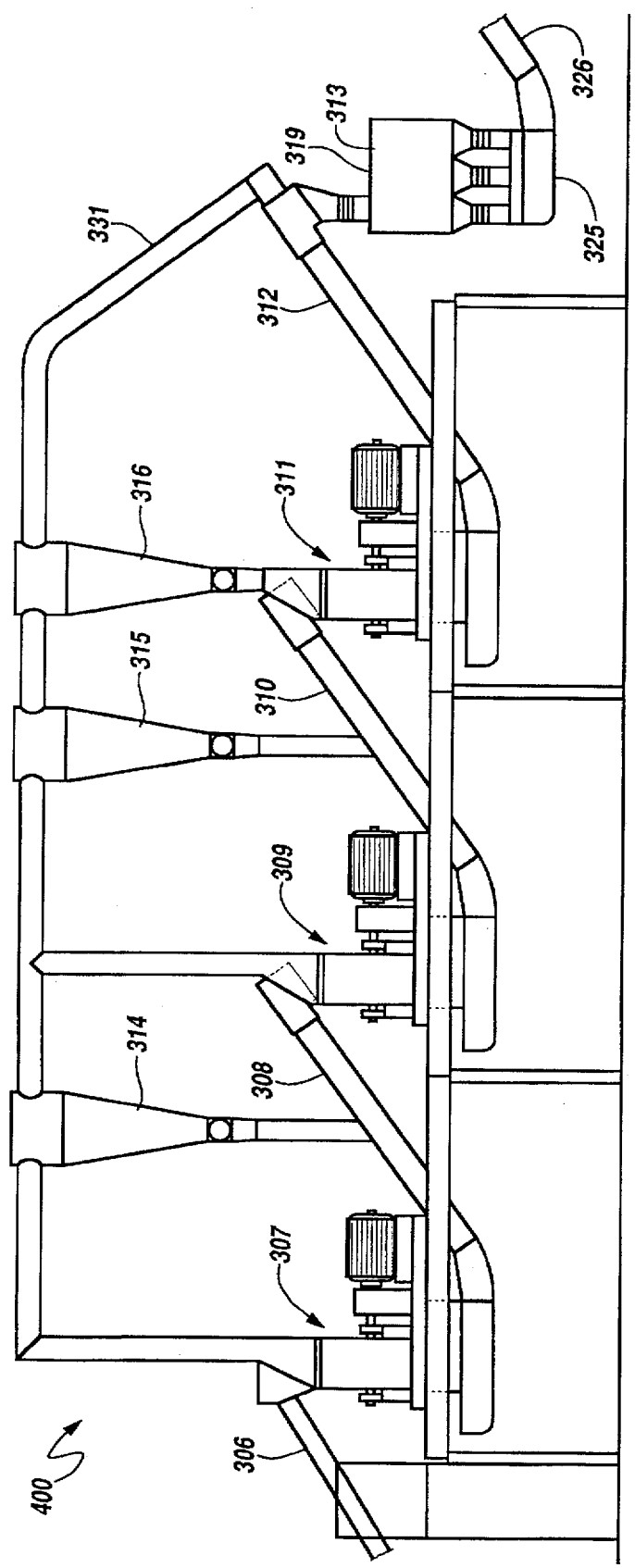

As shown in the flow diagram 200 in FIG. 2, step 201 entails providing bulk quantities of PWA's and/or PWB's, such as PWA 100 and/or PWB 110 having IC's 120 shown in FIG. 1 and container 350 in FIG. 3. Step 202 entails the placement of PWA's 100 and/or PWB's 110 onto belt conveyor 301 (in FIG. 3), which transports PWA's 100 and/or PWB's 110 into shredder 302 (in FIG. 3). Step 203 entails the shredding of these PWA's/PWB's, whereby they are reduced in size to figments nominally 3" in size. Shredder 302 is the primary shredder, but additional shredders can be used. Because shredder 302 is maintained under a (partial) vacuum, dust produced by the shredding operation is transported via a duct 331 in FIGS. 3 and 4A (shown as path 217 in FIG. 2) to a bag-house dust filter 303 in FIG. 3, which collects the dust, as shown in step 214 in FIG. 2. The dust is transported via closed conveyor 304 to dust collector 322, as shown in steps 215 and 216 in FIG. 2.

Referring to FIG. 2, first grouping 240 corresponds to a group of steps that generally crush and reduce the results from shredder 203 in FIG. 2 and shown as 302 in FIG. 3 in size. Step 204 in FIG. 2 shows the results from shredder 302 being transported via belt conveyor 306 in FIGS. 3 and 4A into a first crushing machine, such as first hammer mill 307 in FIGS. 3 and 4A. Step 205 refers to the crushing action of the first crushing machine, such as the hammers of hammer mill 307, combined with natural abrasion of the crushed particles against one another to reduce the size of the particles in it. First hammer mill 307 is fitted with a first screen 340 at its exit port with the diameter of screen openings in the approximate range of $1/16$" to 2", preferably in the range of 1" to 1¼". Consequently, the exit stream from first hammer mill 307 preferably contains particles with a maximum diameter equal to the diameter of screen openings of first screen 340. The exit stream from first hammer mill 307 is fed to first closed conveyor 308, referred to by step 206B in FIG. 2, and then into a second crushing machine, such as second hammer mill 309 (in FIGS. 3 and 4A), which is referred to by step 207 in FIG. 2. Second hammer mill 309 provides for further size reduction of the particles crushed by first hammer mill 307, which is referred to in step 207 in FIG. 2. Second hammer mill 309 preferably contains a second screen 341 which has openings with a diameter in the approximate range of $1/16$" to 1", preferably in the range of $7/16$"–$9/16$". Once again, particles exiting second hammer mill 309 have a maximum diameter equal to the diameter of these openings. As referenced in step 208B in FIG. 2, the exit stream from second hammer mill 309 is then fed via second closed conveyor 310, referred to by step 208B in FIG. 2, into a third crushing machine, such as third hammer mill 311 in FIGS. 3 and 4A. The crushing operation performed by third hammer mill 311 is referred to by step 209 in FIG. 2. Third hammer mill 311 contains a third screen 342 at its exit port that has openings with a diameter in the approximate range of $1/16$"–½", preferably in the range of $3/16$"–$5/16$". The size reduction associated with hammer mill 311 results in particles having a maximum diameter equal to the size of the screen opening. These particles exit third hammer mill 311 and are transported via third closed conveyor 312, which is referred to by step 210B, to first fluidized bed separator 313, which is referred to by step 211A. Note, as shown in FIGS. 2, 3, and 4A, additional fluidized bed separators may be used, such as second fluidized bed separator 319 (in FIG. 3), which is referred to by step 211B in FIG. 2. The dotted lines in FIG. 2 are intended to denote this option.

Third grouping 244 corresponds to a group of steps that generally remove light-weight metallic and non-metallic portions from the stream, separate light-weight non-metallic and metallic portions, and return light-weight metallic portions to the stream. As discussed above, first hammer mill 307, second hammer mill 309, and third hammer mill 311 are maintained under a (partial) vacuum, so that lighter weight portions, which may contain some metallic material from the feed-stock of crushed PWA's/PWB's are transported to first cyclone air separator 314, second cyclone air separator 315, and third cyclone air separator 316 in FIG. 3, respectively. Steps 206A, 208A, and 210A in FIG. 2 denote this operation, respectively. The configuration of first cyclone air separator 314, second cyclone air separator 315, and third cyclone air separator 316 further separates these lighter weight portions and allows heavy particles from such airborne mixtures to fall, under the force of gravity, into first closed conveyor 308, second closed conveyor 310, and third closed conveyor 312 respectively, where these particles are returned to the processing stream, which are illustrated by paths 206C, 208C, 210C, and 210D in FIG. 2. FIGS. 3, 4A, and 4B show these particles being returned to the processing stream via paths 206C, 208C, and 210D, but an additional path could be added to the preferred embodiment shown in FIGS. 3, 4A, and 4B to correspond to path 210C, as shown in FIG. 2. Also, as shown in FIGS. 4A and 4B, first cyclone air separator 314 may also pull light-weight non-metallic and metallic portions from first hammer mill 307 via path 229A in FIG. 2. And, as shown in FIGS. 3, 4A, and 4B, first cyclone air separator 314 may also pull light-weight metallic and non-metallic portions from first closed conveyor 308 via path 229B in FIG. 2. Similarly, as shown in FIGS. 4A and 4B, second cyclone air separator 315 may also pull light-weight metallic and non-metallic portions from second hammer mill 309 via path 232A in FIG. 2. And, as shown in FIGS. 3, 4A, and 4B, second cyclone air separator 315 may also pull light-weight metallic and non-metallic portions from second closed conveyor 310 via path 232B in FIG. 2. Dust particles that are generally comprised of non-metallic substances from first cyclone air separator 314, second cyclone air separator 315, and third cyclone air separator 316 are transported via ducts 331 (shown in path 217 in FIG. 2) to baghouse 303 in FIGS. 3, 4, and 4B and ultimately via fourth closed conveyor 304 to dust collector 322, which are highlighted by steps 214, 215, and 216 in FIG. 2.

As shown in FIGS. 2 and 3, second grouping 242 corresponds to a group of steps that generally separate light-weight non-metallic and metallic portions from the stream being separated by first gravity separator 313 and second gravity separator 319. Referring to first gravity separator 313, such as a fluidized fed separator, the finely sized reduced stream flows over a inclined vibrating deck, where through the action of air blown from below the deck and vacuum pulling from above, a fluidized bed of air is produced upon which the mixture of size reduced metals and non-metallic base are separated, based on the differences in their specific gravity. The (partial) vacuum in first gravity separator 313 causes airborne dust to be transported via a duct 330 in FIGS. 3 and 4A to third cyclone air separator 316 and heavier weight particles are separated and passed back through first gravity separator 313, as shown in FIG. 2 as paths 230A and 230B. Paths 230A and 230B from first gravity separator 313 and second gravity separator 319 to third cyclone air separator 316 along with third cyclone air separator 316 and the other paths connected to third cyclone air separator 316, such as paths 210C, 210D, and 210E, generally work together to form fourth grouping 246 to remove light-weight metallic and non-metallic portions, separate non-metallic from metallic portions, and return light-weight metallic portions to the stream. Dust particles that are generally comprised of non-metallic substances from third air separator 316 are transported via duct 331 to bag-house filter 303 and into dust collector 322. The staged sequence of size reduction and separation allows easy segregation between the heavier metals portion at the top of the deck, which is discharged to first metal collection container 317 in FIGS. 3 and 4B and the lighter weight fines portion, which is discharged to first fines collection container 318 in FIGS. 3 and 4B, which are referred to as steps 212A and 213A in FIG. 2. Lighter weight fines portion are transferred to first fines collection container 318 via fifth closed conveyor 329 in FIGS. 3 and FIG. 4B. As a result, since the heavier dust portions are returned to the stream by first air separator 314, second air separator 315, and third air separator 316, the stream is constantly enriched with material that is substantially comprised of metallic portions. Also, note in FIGS. 3, 4A, and 4B that the output of first gravity separator 313 is split into two sections 332 and 325 in which section 332 discharges the first fines on fifth closed conveyor 329 to first fines collection container 318. Section 325 directly discharges the heavier weight particles into first metal collection container 317.

Also, depending on the size of first hammer mill 307, second hammer mill 309, and third hammer mill 311 and the attendant flow rate, alternate preferred embodiments may split up the stream of material from third closed conveyor 312 into two or more sub-streams, so that the material flows into first gravity separator 313 and into second gravity separator 319, both of which are preferably fluidized bed separators, which are illustrated by steps 211A and 211B in FIG. 2. Additionally, depending upon the size of the mills and their respective flow rates, additional separators may be incorporated. Such a configuration prevents first gravity separator 313 from becoming overloaded. Alternate preferred embodiments may also produce approximately equivalent separation in both first gravity separator 313 and second gravity separator 319. Granulated metals may then be collected in both first metal collector 317(step 212A in FIG. 2) and second metal collector 320 as fines are collected in both first fines collector 318 and second fines collector 321. As with first gravity separator 313, airborne dust in second gravity separator 319 is transported, via a duct 330, back through third cyclone air separator 316 and then back to first gravity separator 313 and second gravity separator 319. Lighter weight fines portion are transferred to second fines collection container 321 via sixth closed conveyor 324 in FIGS. 3 and 4B. Also, note in FIGS. 3 and 4A that the output of second gravity separator 319 is split into two sections 331 and 326 in which section 331 discharges the first fines on sixth closed conveyor 324 to second fines collection container 321. Section 326 directly discharges the heavier weight particles into second metal collection container 320.

FURTHER MODIFICATIONS AND VARIATIONS

Although the invention has been described with reference to a specific embodiment, this description is not meant to be construed in a limiting sense. The example embodiments shown and described above are only exemplary. Various modifications of the disclosed embodiment as well as alternate embodiments of the invention will become apparent to persons skilled in the art upon reference to the description of the invention. Alternate machinery may be used to separate the particles, other than that shown and discussed above. For instance, alternative crushing machines may be selected from a list including, but not limited to, Radial Knife Granulators, Roll Crushers, Jaw Crushers, Ball Mills, Disk Granulators, Impact Mills, and the like. Alternative air separators may be selected from a list including, but not limited to, Air Classifiers, Air Stratifyers, Centrifugal Air Classifiers, Venturi Separators, Trickle Vane Separators, Rising Current Density Separators, and the like. Alternative separators to gravity separators may be selected from a list including, but not limited to, Electrostatic Separators, Electrodynamic Separators, Vibrating Screen Separators, Destoners, and the like. Likewise, the number of crushing machines, conveyor belts, separators, and screens may vary as well, depending on the particular application. Thus, even though numerous characteristics and advantages of the present inventions have been set forth in the foregoing description, together with details of the structure and function of the inventions, the disclosure is illustrative only, and changes may be made in the detail, especially in matters of shape, size and arrangement of the parts within the principles of the inventions to the full extent indicated by the broad general meaning of the terms used in the attached claims. Accordingly, it should be understood that the modifications and variations suggested above and below are not intended to be exhaustive. These examples help show the scope of the inventive concepts, which are covered in the appended claims. The appended claims are intended to cover these modifications and alternate embodiments. In short, the restrictive description and drawings of the specific examples above are not intended to point out what an infringement of this patent would be, but are to provide at least one explanation of how to make and use the inventions contained herein. The limits of the inventions and the bounds of the patent protection are measured by and defined in the following claims.

What is claimed is:

1. An apparatus to isolate precious and semi-precious metals from at least one electronic circuit board, comprising:

(a) a plurality of crushing machines, each crushing machine having a crushing machine entry port and a crushing machine exit port, said plurality of crushing machines having a first crushing machine and at least one second crushing machine, said first crushing machine having a first crushing machine entry port and a first crushing machine exit port, said first crushing machine receives said at least one electronic circuit board and creates at least one first crushed electronic component, each second crushing machine of said at least one second crushing machine having a second crushing machine entry port and a second crushing machine exit port, said second crushing machine receives said at least one first crushed electronic component and creates at least one second crushed electronic component;

(b) a plurality of conveyors, a first conveyor of said plurality of conveyors positioned to transport said at least one electronic circuit board to said first crushing machine entry port of said first crushing machine of said plurality of crushing machines, at least one second conveyor of said plurality of conveyors positioned to receive and transport said at least one first crushed electronic component from said first crushing machine exit port to said second crushing machine entry port of said second crushing machine of said plurality of crushing machines;

(c) a plurality of screens, each crushing machine of said plurality of crushing machines having at least one screen of said plurality of screens positioned to screen each crushing machine exit port to selectively allow passage of specifically sized products, wherein said specifically sized products passed through a first screen which correspond to said at least one first crushed electronic component and are larger than said specifically sized products allowed to be passed through a second screen which correspond to said at least one second crushed electronic component, said first screen preceding said second screen;

(d) at least one first separating machine to receive said at least one second crushed electronic component from said second crushing machine exit port of said at least one second crushing machine of said plurality of crushing machines via said plurality of conveyors, said at least one separating machine separates non-metallic constituent components from metallic constituent components of said at least one second crushed electronic component; and (e) at least one second separating machine to receive at least one first light-weight metallic constituent component and at least one first light-weight non-metallic constituent component of said at least one first crushed electronic component, said at least one second separating machine repeatedly separates said at least one first light-weight metallic constituent component from said at least one first light-weight non-metallic constituent component, and returns said at least one first light-weight metallic constituent component to said plurality of crushing machines, said at least one second separating machine to receive at least one second light-weight metallic constituent component and at least one second light-weight non-metallic constituent component of said at least one second crushed electronic component, said at least one second separating machine repeatedly separates said at least one second light-weight metallic constituent component from said at least one second light-weight non-metallic constituent component, and returns said at least one second light-weight metallic constituent component to said plurality of crushing machines.

2. The apparatus of claim 1, wherein each crushing machine of said plurality of crushing machines are selected from a group consisting of ring mills, radial knife granulators, roll crushers, jaw crushers, ball mills, disk granulators, impact mills, and hammer mills.

3. The apparatus of claim 1, wherein each screen of said plurality of screens has a plurality of openings to selectively allow said passage of specifically sized products.

4. The apparatus of claim 3, wherein at least one opening of said plurality of openings of said first screen allows passage of specifically sized products having diameters between 1/16" and 2" and at least one opening of said plurality of openings of said second screen allows passage of specifically sized products having diameters between 1/16" and 1".

5. The apparatus of claim 3, wherein at least one opening of said plurality of openings of said first screen allows passage of specifically sized products having diameters between 3/4" and 1" and at least one opening of said plurality of openings of said second screen allows passage of specifically sized products having diameters between 3/16 and 3/8.

6. The apparatus of claim 1, wherein said at least one first separating machine is a gravity separator and wherein said metallic constituent components are generally heavier than said non-metallic constituent components, so that said gravity separator is able to separate said metallic constituent components from said non-metallic constituent components by weight.

7. The apparatus of claim 1, wherein said at least one first separating machine is a fluidized bed separator.

8. The apparatus of claim 1, further comprising (f) a collection apparatus mechanically coupled to said at least one second separating machine to receive and to filter said at least one first light-weight non-metallic constituent component removed from said at least one first crushed electronic component after said at least one first light-weight non-metallic constituent component has been separated from said at least one first light-weight metallic constituent component by said at least one second separating machine, said collection apparatus also mechanically coupled to said at least one second separating machine to receive said at least one second light-weight non-metallic constituent component removed from said at least one second crushed electronic component after said at least one second light-weight non-metallic constituent component has been separated from said at least one second light-weight metallic constituent component by said at least one second separating machine.

9. The apparatus of claim 1, wherein each conveyor of said plurality of conveyors is closed.

10. The apparatus of claim 9, further comprising a first belt conveyor to transfer said at least one electronic circuit board after being shredded by said at least one shredder from said at least one shredder to said first crushing machine entry port of said first crushing machine.

11. The apparatus of claim 1, further comprising
(f) a shredder to shred said at least one electronic circuit board without cryogenic processing before said at least one electronic circuit board is transferred to said first crushing machine entry port of said first crushing machine of said plurality of crushing machines.

12. The apparatus of claim 11, further comprising a second belt conveyor to transfer said at least one electronic circuit board to said shredder.

13. The apparatus of claim 1, wherein each second separating machine of said at least one second separating machine is a cyclone air separator.

14. The apparatus of claim 1, wherein said electronic circuit board is selected from a group consisting of printed wiring assemblies, printed wiring board, and trim scrap from printed wiring boards.

15. The apparatus of claim 1, wherein said at least one second separating machine is selected from a group consisting of Air Classifiers, Cyclone Air Separators, Air Stratifyers, Centrifugal Air Classifiers, Venturi Separators, Trickle Vane Separators, and Rising Current Density Separators.

16. The apparatus of claim 1, wherein said at least one first separating machine is selected from a group consisting of gravity separators, electrostatic separators, electrodynamic separators, vibrating screen separators, and destoners.

17. The apparatus of claim 1, further wherein said at least one second separating machine to receive at least one second light-weight metallic constituent component and at least one second light-weight non-metallic constituent component of said non-metallic constituent components and said metallic constituent components, said at least one second separating machine continuously separates said at least one second light-weight metallic constituent component from said at least one second light-weight non-metallic constituent component, and returns said at least one second light-weight metallic constituent component to said plurality of crushing machines.

18. The apparatus of claim 1, wherein said at least one first separating machine is non-magnetic.

19. An apparatus to isolate precious and semi-precious metals from at least one electrical circuit board, comprising:
(a) a first crushing machine to crush said at least one electrical circuit board to create at least one crushed electrical product, said at least one crushed electrical product creating a first flow from said first crushing machine, said first crushing machine having a first screen positioned to regulate said first flow of said at least one first crushed electrical product from said first crushing machine;

b) a second crushing machine to crush said at least one first crushed electrical product to create at least one second crushed electrical product, said at least one second crushed electrical product creating a second flow from said second crushing machine, said second crushing machine having a second screen positioned to regulate said second flow of said at least one second crushed electrical product from said second crushing machine;

(c) a third crushing machine to crush said at least one third crushed electrical product to create at least one third crushed electrical product, said at least one third crushed electrical product creating a third flow from said third crushing machine, said third crushing machine having a third screen positioned to regulate said third flow of said at least one third crushed electrical product from said third crushing machine;

(d) at least one first separating machine to receive said at least one third crushed electrical product from said third crushing machine to separate metallic portions from non-metallic portions of said at least one third crushed electrical product forming said third flow; and (e) at least one second separating machine positioned to remove at least one first light-weight metallic constituent component and at least one first light-weight non-metallic constituent component from said first flow, said at least one second separating machine repeatedly separates said at least one first light-weight metallic constituent component from said at least one first light-weight non-metallic constituent component, and returns said at least one light-weight metallic constituent component to said first flow, said at least one second separating machine positioned to receive at least one second light-weight metallic constituent component and at least one second light-weight non-metallic constituent component of said second flow, said at least one second separating machine repeatedly separates said at least one second light-weight metallic constituent component from said at least one second light-weight non-metallic constituent component, and returns said at least one second light-weight metallic constituent component to said second flow, said at least one second separating machine positioned to receive at least one third light-weight metallic constituent component and at least one third light-weight non-metallic constituent component of said third flow, said at least one second separating machine repeatedly separates said at least one third light-weight metallic constituent component from said at least one third light-weight non-metallic constituent component, and returns said at least one third light-weight metallic constituent component to said third flow.

20. The apparatus of claim 19, further comprising (f) a plurality of conveyors to transport said at least one first crushed electrical product from said first crushing machine to said second crushing machine, said at least one second crushed electrical product from said second crushing machine to said third crushing machine, and said third crushed electrical product from said third crushing machine to said at least one first separating machine.

21. The apparatus of claim 20, wherein each conveyor of said plurality of conveyors is closed.

22. The apparatus of claim 19, wherein said first, second, and third crushing machines are selected from a group consisting of ring mills, radial knife granulators, roll crushers, jaw crushers, ball mills, disk granulators, impact mills, and hammer mills.

23. The apparatus of claim 19, wherein said first screen has a first plurality of openings, said second screen has a second plurality of openings, and said third screen has a third plurality of openings, said first plurality of openings regulates said first flow, said second plurality of openings regulates said second flow, and said third plurality of openings regulates said third flow.

24. The apparatus of claim 23, wherein said first plurality of openings allows passage of said at least one first crushed electrical product having a diameter between 1" and 1¼".

25. The apparatus of claim 23, wherein said first plurality of openings allows passage of said at least one first crushed electrical product having a diameter between 7/16" and 9/16".

26. The apparatus of claim 23, wherein said second plurality of openings allows passage of said at least one second crushed electrical product having a diameter between 3/16" and 5/16".

27. The apparatus of claim 23, wherein said at least one first separating machine is a fluidized bed separator.

28. The apparatus of claim 23, wherein each opening of said second plurality of openings is generally smaller than each opening of said first plurality of openings, said third plurality of openings is generally smaller than each opening of said second plurality of openings.

29. The apparatus of claim 19, wherein said at least one first separating machine is a gravity separator and wherein said metallic components are generally heavier than said non-metallic components.

30. The apparatus of claim 19, wherein said metallic portions generally have a higher specific gravity than said non-metallic portions.

31. The apparatus of claim 19, further comprising (f) a collection apparatus mechanically coupled to said at least one second separating machine to receive and filter said at least one first light-weight non-metallic constituent component removed from said at least one first crushed electronic component after said at least one first light-weight non-metallic constituent component has been separated from said at least one first light-weight metallic constituent component by said at least one second separating machine, said collection apparatus also mechanically coupled to said at least one second separating machine to receive said at least one second light-weight non-metallic constituent component removed from said at least one second crushed electronic component after said at least one second light-weight non-metallic constituent component has been separated from said at least one second light-weight metallic constituent component by said at least one second separating machine, and said collection apparatus also mechanically coupled to said at least one second separating machine to receive said at least one third light-weight non-metallic constituent component removed from said at least one second crushed electronic component after said at least one third light-weight non-metallic constituent component has been separated from said at least one light-weight metallic constituent component by said at least one second separating machine.

32. The apparatus of claim 31, wherein said collection apparatus comprises a bag house filter to receive said dust from said at least one second separating machine.

33. The apparatus of claim 19, further comprising a shredder to shred at least one pre-shredded electrical circuit board without cryogenic processing to create said at least one electrical circuit board, said at least one electrical circuit board transferred to said first crushing machine.

34. The apparatus of claim 33, further comprising a belt conveyor to transfer said at least one electrical circuit board from said shredder to said first crushing machine.

35. The apparatus of claim 33, further comprising a belt conveyor to transfer said at least one pre-shredded electrical circuit board to said shredder.

36. The apparatus of claim 19, wherein said first crushing machine, said second crushing machine, said third crushing machine, said at least one first separating machine, and said at least one second separating machine is maintained under a partial vacuum to permit collection of dust in a closed collector.

37. The apparatus of claim 19, wherein said electrical circuit board is selected from a group consisting of printed wiring assemblies, printed wiring boards, and trim scrap from printed wiring boards.

38. The apparatus of claim 19, wherein said at least one second separating machine is an air separator that is selected from a group consisting of Air Classifiers, Cyclone Air Separator, Air Stratifyers, Centrifugal Air Classifiers, Venturi Separators, Trickle Vane Separators, and Rising Current Density Separators.

39. The apparatus of claim 19, wherein said at least one first separating machine is selected from a group consisting of gravity separators, electrostatic separators, electrodynamic separators, vibrating screen separators, and destoners.

40. The apparatus of claim 19, wherein said at least one first separating machine is a non-magnetic gravity separator and said at least one second separating machine is an air separator.

41. An apparatus to isolate precious and semi-precious metals from an electrical circuit board, comprising:

(a) a first hammer mill to crush said electrical circuit board to create a first plurality of crushed electrical components that combine to form a first stream of said plurality of crushed electrical components, said first hammer mill having a first screen positioned to regulate said first stream of said first plurality of crushed electrical components generated by said first hammer mill;

(b) a second hammer mill to crush said first plurality of crushed electrical components to create a second plurality of crushed electrical components that combine to form a second stream of said second plurality of crushed electrical components, said second hammer mill having a second screen positioned to regulate said second stream of said second plurality of crushed electrical components generated by said second hammer mill;

(c) a third hammer mill to crush said second plurality of crushed electrical components to create a third plurality of crushed electrical components that combine to form a third stream of said third plurality of crushed electrical components, said third hammer mill having a third screen positioned to regulate said third stream of said third plurality of crushed electrical components generated by said third hammer mill;

(d) a gravity separator to receive said third plurality of crushed electrical components from said third hammer mill to separate metallic portions from non-metallic portions of said third stream of said third plurality of crushed electrical components;

(e) a first air separator positioned to remove at least one first light-weight metallic constituent component and at least one first light-weight non-metallic constituent component from said first stream of said first plurality of crushed electrical components, said first air separator to continuously separate said at least one first light-weight metallic constituent component from said at least one first light-weight non-metallic constituent component, and to return said at least one first light-weight metallic constituent component to said first stream of said first plurality of crushed electrical components;

(f) a second air separator positioned to remove at least one second light-weight metallic constituent component and at least one second light-weight non-metallic constituent component of said second stream of said second plurality of crushed electrical components, said second air separator to continuously separate said at least one second light-weight metallic constituent component from said at least one second light-weight non-metallic constituent component, and to return said at least one second light-weight metallic constituent component to said second stream of said second plurality of crushed electrical components; and (g) a third air separator positioned to remove at least one third light-weight metallic constituent component and at least one third light-weight non-metallic constituent component of said third stream of said third plurality of crushed electrical components, said third air separator to continuously separate said at least one third light-weight metallic constituent component from said at least one third light-weight non-metallic constituent component, and to return said at least one third light-weight metallic constituent component to said third stream of said third plurality of crushed electrical components.

42. The apparatus of claim 41, further comprising (e) a plurality of conveyors to transport said first plurality of crushed electrical components from said first hammer mill to said second hammer mill, said second plurality of crushed electrical components from said second hammer mill to said third hammer mill, and said third plurality of crushed electrical components from said third hammer mill to said gravity separator.

43. The apparatus of claim 41, wherein said first screen has a first plurality of openings, said second screen has a second plurality of openings, and said third screen has a third plurality of openings, said first plurality of openings regulates said first stream, said second plurality of openings regulates said second stream, and said third plurality of openings regulates said third stream, further wherein each opening of said first plurality of openings is generally larger than each opening of said second plurality of openings and each opening of said second plurality of openings is generally larger than each opening of said third plurality of openings.

44. The apparatus of claim 43, wherein said first plurality of openings allows passage of said first plurality of crushed electrical components having a diameter between 1" and 1¼", wherein said second plurality of openings allows passage of said second plurality of crushed electrical components having a diameter between 7/16 and 9/16", and wherein said third plurality of openings allows passage of said third plurality of crushed electrical components having a diameter between 3/16" and 5/16".

45. The apparatus of claim 41, wherein said gravity separator is a fluidized bed separator.

46. The apparatus of claim 41, further comprising (h) a collection apparatus mechanically coupled to said first air separator, said second air separator, and said third air separator machine to receive and filter said at least one first light-weight non-metallic constituent component removed from said first stream after said at least one first light-weight non-metallic constituent component has been separated from said first light-weight metallic constituent component by said first air separator, said collection apparatus also mechanically coupled to said second air separator to receive said at least one second light-weight non-metallic constituent component removed from said second stream after said at least one second light-weight non-metallic constituent component has been separated from said at least one second light-weight metallic constituent component by said at least one second air separator, and said collection apparatus also mechanically coupled to said third air separator to receive said at least one third light-weight non-metallic constituent component removed from said third stream after said at least one third light-weight non-metallic constituent component has been separated from said at least one third light-weight metallic constituent component by said at least one third separator.

47. The apparatus of claim 41, wherein said first air separator returns said at least one first light-weight metallic constituent component to said first stream while said first stream is being transported from said first hammer mill to said second hammer mill, said second air separator returns said at least one second light-weight metallic constituent component to said second stream while said second stream is being transported from said second hammer mill to said third hammer mill, and said third air separator returns said at least one third light-weight metallic constituent component to said third stream at said third hammer mill.

48. The apparatus of claim 41, wherein said third air separator removes said at least one third light-weight metallic constituent component and at least one third light-weight non-metallic constituent component of said third stream at said third hammer mill and said gravity separator.

49. An apparatus to substantially isolate precious and semi-precious metals from at least one electronic circuit board, comprising:

(a) at least one crushing and size reducing machine to substantially reduce said at least one electronic circuit board to create a first stream of a plurality of crushed electronic components;

(b) at least one first separator positioned to substantially separate by weight said plurality of crushed electronic components of said stream of said plurality of crushed electronic components into at least one non-metallic constituent component and at least one metallic constituent component to create a second stream of separated crushed electronic components; and (c) at least one second separator positioned to substantially remove at least one first light-weight non-metallic constituent component, if any, and at least one first light-weight metallic constituent component, if any, from said first stream of said plurality of crushed electronic components, if any, to substantially separate said at least one first light-weight non-metallic constituent component from said first light-weight metallic constituent component, and to substantially return said at least one first light-weight metallic constituent component to said first stream of said plurality of crushed electronic components, said at least one second separator also positioned to substantially remove at least one second light-weight non-metallic constituent component, if any, and at least one second light-weight metallic constituent component from said second stream of said plurality of separated crushed electronic components, if any, to substantially separate said at least one second light-weight non-metallic constituent component from said second light-weight metallic constituent component, and to substantially return said at least one second light-weight metallic constituent component to said first stream of said plurality of crushed electronic components.

50. The apparatus of claim 49, further comprising (d) a plurality of closed conveyors to transport said crushed electronic components from one crushing and size reducing machine to another crushing and size reducing machine and from said at least one crushing and size reducing machine to said at least one first separator.

51. The apparatus of claim 49, wherein said at least one crushing and size reducing machine is selected from a group consisting of ring mills, radial knife granulators, roll crushers, jaw crushers, ball mills, disk granulators, impact mills, and hammer mills.

52. The apparatus of claim 49, wherein said at least one crushing and size reducing machine repeatedly crushes said at least one electronic circuit board to form said first stream of said plurality of crushed electronic components until generally each crushed electronic of said plurality of crushed electronic components substantially conform to a specific size.

53. The apparatus of claim 52, wherein said specific size has a diameter approximately between $1/16$" and 2".

54. The apparatus of claim 49, wherein said at least one first separator is a fluidized bed separator.

55. The apparatus of claim 49, further comprising;

(d) a collection apparatus mechanically coupled to said at least one second separator to receive and to filter said first light-weight non-metallic components removed from said first stream of said plurality of crushed electronic components and said second light-weight non-metallic components removed from said second stream of said plurality of separated crushed electronic components.

56. The apparatus of claim 49, further comprising (d) a shredder to shred said at least one electronic circuit board without cryogenic processing before said at least one size and crushing machine reduces said at least one electronic circuit board to create said first stream of said plurality of crushed electronic components.

57. The apparatus of claim 49, wherein said electronic circuit board is selected from a group consisting of printed wiring assemblies, printed wiring boards, and trim scrap from printed wiring boards.

58. The apparatus of claim 49, wherein said at least one second separator is selected from a group consisting of Air Classifiers, Cyclone Air Separator, Air Stratifyers, Centrifugal Air Classifiers, Venturi Separators, Trickle Vane Separators, and Rising Current Density Separators.

59. The apparatus of claim 49, wherein said at least one first separator is selected from a group consisting gravity separators, electrostatic separators, electrodynamic separators, vibrating screen separators, and destoners.

* * * * *